3,392,167
NOVEL s-TETRAZINE AND METHOD FOR
PREPARING SAME
Albert William Lutz, Princeton, N.J., assignor to American Cyanamid Company, Stamford, Conn., a corporation of Maine
No Drawing. Continuation-in-part of application Ser. No. 241,503, Dec. 3, 1962. This application July 15, 1964, Ser. No. 382,942
12 Claims. (Cl. 260—241)

This application is a continuation-in-part of a copending application for United States Letters Patent No. 3,155,488.

The present invention relates to novel substituted tetrazines and to methods for their preparation. More particularly, it relates to substituted s-tetrazines represented by the formula:

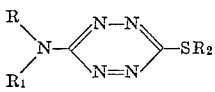

wherein R and $R_1$ stand for either hydrogen, lower alkyl or alkenyl radicals of from one to four carbon atoms and $R_2$ represents either a lower alkyl or a lower alkenyl radical.

The substituted tetrazines of the present invention find utility as herbicides. They are particularly effective as pre-emergence herbicides.

In the preparation of the 3-alkylthio-6-amino-s-tetrazines hereinabove defined, a 3,6-bis-alkylthio-s-tetrazine is conveniently subjected to the action of either ammonia, a monoalkylamine or a dialkylamine, such as monomethylamine, dimethylamine and monoisobutylamine under at least autogenous pressure. In general, at least equimolar amounts of ammonia or the amine and the bis-alkylthio-s-tetrazine aforementioned are reacted over a period of from one to about fifteen hours at temperatures from about 50° C. to about 100° C. To insure optimum yields, at least a 10% mol excess of ammonia or the amine, autogenous pressures, temperatures from about 70° C. to about 85° C. and a reaction time from two to ten hours are employed.

Illustrative disubstituted alkylthio- or alkenylthio-s-tetrazine reactants which can be employed in the present invention include:

3,6-bis-methylthio-s-tetrazine,
3,6-bis-ethylthio-s-tetrazine,
3,6-bis-n-propylthio-s-tetrazine,
3,6-bis-isopropylthio-s-tetrazine,
3,6-bis-n-butylthio-s-tetrazine,
3,6-bis-isobutylthio-s-tetrazine,
3,6-bis-(sec.butylthio)-s-tetrazine,
3-methylthio-6-ethylthio-s-tetrazine,
3-propylthio-6-n-butylthio-s-tetrazine, and
3,6-bis-allylthio-s-tetrazine.

Exemplary of the amine reactants are: ammonia, monomethylamine, dimethylamine, monoethylamine, monoisobutylamine, diisopropylamine, di-n-butylamine, diisobutylamine, monoallylamine, diallylamine and equivalents thereof. Preferably, the amine reactant is employed in its anhydrous form.

The invention will be further illustrated by the following examples which are not to be taken as limitative thereof. Unless otherwise noted, the parts given are by weight.

Example 1.—Preparation of 3-methylthio-6-dimethylamino-s-tetrazine 3,6-bis-methylthio-s-tetrazine (0.50 part) is added to a solution of 5 parts of anhydrous dimethylamine in 20 parts (by volume) of absolute ethanol in a vessel which is sealed and heated in an oil bath at 70° C. to 75° C. for seven hours. The reaction mixture is then evaporated to dryness, extracted with boiling petroleum ether until the extracts are colorless, and the combined extracts are concentrated and chromatographed on Woelm alumina.

Employing as eluent a mixture of petroleum ether and benzene, 0.032 part of red needles is obtained and identified as impure 3,6-bis-dimethylamine-s-tetrazine, corresponding to 10.9% yield.

Later fractions give 0.261 part of orange-red needles (53.3% yield) which, when recrystallized from petroleum ether, have a melting point of 38.5° C.–40.5° C. A sample which has a melting point of 37° C. to 38.5° C. analyzes in percent as follows:

Calcd. for $C_5H_9N_5S$: C, 34.83; H, 5.31; N, 40.80; S, 18.95. Found: C, 35.07; H, 5.30; N, 40.92; S, 18.73.

Similarly, 3-methylthio-6-amino-s-tetrazine is obtained in good yield following the procedure above in every detail except that ammonia is substituted for the methylamine reactant therein.

Example 2.—Preparation of 3-methylthio-6-diethylamino-s-tetrazine

Following the procedure of Example 1 above, the 3-methylthio-6-diethylamino-s-tetrazine is prepared by employing diethylamine in lieu of dimethylamine utilized therein. Diethylamine (1.2 mols) is heated in the presence of 1 mol of 3,6-bis-methylthio-s-tetrazine at 50° C.–100° C. for five to ten hours in ethanol as a solvent. A good yield of 3-methylthio-6-diethylamino-s-tetrazine is recovered from the reaction mixture.

In a similar manner 3-methylthio-6-(sec.butylamino)-s-tetrazine is obtained in good yield by employing sec.butylamine in lieu of the diethylamine reactant.

Example 3.—Preparation of 3-monoisobutylamino-6-methylthio-s-tetrazine

In a suitable pressure vessel, one part of 3,6-bis-methylthio-s-tetrazine is suspended in 20 parts (by volume) of absolute ethanol. To the mixture is added 1.7 parts of monoisobutylamine. The vessel is closed and heated for two hours under autogenous pressure in an oil bath. Resultant reaction mixture, a clear red solution, is then removed from the vessel and evaporated to dryness. The yield of solids obtained is 94% of theoretical, melting at about 50° C.

Recovered solids in the form of red needles are chromatographed on a column of Woelm alumina, proceeding by first developing the chromatogram with petroleum ether, then eluting non-solid impurities with 1:1 petroleum ether-benzene and, finally, eluting the product off the column with ether. Recovery of desired product is 92.8%. Recrystallization of the chromatographed product from petroleum ether results in the recovery of needles which melt between 50° C. and 51.5° C., and has the following analysis in percent:

Calcd. for $C_7H_{13}N_5S$: C, 42.18; H, 6.57; N, 35.15; S, 16.09. Found: C, 42.20; H, 6.69; N, 35.22; S, 16.08.

Example 4

The herbicidal activity of the compounds of the present invention is demonstrated in the following test:

A variety of plant seeds is separately mixed with approximately one-half pint portions of potting soil. These seed-soil mixtures are planted ontop of about one inch potting soil in separate pint cups and watered with 25 milliliters of water and further with 25 milliliters of a solution containing a quantity of active ingredient equal to 25, 5 and 1 pounds per acre for each treatment. The solution is prepared by adding to a 50% acetone/water mixture 0.2 part by weight of an alkyl aryl sodium sulfonate as the surface-active agent.

Active ingredients employed in the tests are set forth in the table below along with the test seed species and the accompanying results. After treatment, the cups are placed in a greenhouse for three weeks. Herbicidal data in Table I below clearly illustrates the effectiveness of the s-tetrazine derivatives of the present invention.

Compounds 1, 2 and 3 set forth in Table I below are, respectively: 3 - methylthio - 6-dimethylamino-s-tetrazine, 3-methylthio-6-sec.butylamino-s-tetrazine and 3 - methylthio-6-isobutylamino-s-tetrazine.

TABLE I

| Test Species | Herbitoxicity Index* | | |
|---|---|---|---|
| | Compound (1), lbs./A | Compound (2), 5 lbs./A | Compound (3), 5 lbs./A |
| | 25  5  1 | | |
| Mustard | 5  5  1 | 5⁻ | |
| Millet | 5  5  5⁻ | 5 | 5 |
| Pigweed | 5  5  3+ | 5 | 5 |
| Purslane | 5  5  1 | 5 | 5 |
| Crabgrass | 5  5  1 | 5⁻ | 5 |
| Wild Oats | 5  2  1 | 2 | 3 |
| Lambsquarters | 5  5⁻  1 | 5⁻ | 5 |
| Watergrass | 5  5⁻  0 | 5⁻ | 5⁻ |

*Herbitoxicity index:
0=No apparent effect.
1=Slight injury.
2=Moderate injury.
3=Severe injury, no plants killed.
3+=Severe injury, up to 50% plants killed.
4=Severe injury, 50 to 75% plants killed.
4+=Severe injury, 75 to 95% plants killed.
5⁻=Severe injury, 95 to 100% plants killed.
5=All plants killed.

Advantageously, the herbicidal compositions are prepared by admixing the active compound with an inert carrier material of the type or kind referred to in the art as pest control adjuvants in solid or liquid form. Typical carriers include the talcs, clays, pumice, silica, chalk, diatomaceous earth, walnut shell flour and equivalents thereof.

Liquid compositions may be prepared by dissolving the active compound in water or by initially dissolving in common organic solvents and then admixing the resultant solutions with water either with or without an emulsifying agent. The s-tetrazine compounds are quite soluble in common organic solvents, such as acetone, methyl isobutyl ketone, ethanol, dioxane and isopropyl acetate.

Emulsifying or surface-active agents which can be employed herein are those normally employed for the preparation of oil-in-water emulsions. Illustrative of the latter are ionic and non-ionic dispersing or emulsifying agents, such as the higher alkyl aryl sulfonates or polyglycol ether, which are commercially available. The emulsifying agent is generally employed in small concentrations in the range of from about 0.1% to 2% by weight of the total weight of the composition.

The compounds of the present invention may be applied either as a spray or as a dust to the area or locus to be protected from undesirable plant growth. The amount of the s-tetrazine compound in the herbicidal composition will, of course, vary in the manner and purpose for which the composition is to be employed. Concentrates for subsequent use in preparing spray formulations may contain as much as 90%, or more, by weight of the active ingredient. Sprays or dusts for direct use will be relatively dilute, in some cases as low as 0.5%, or less.

What is claimed is:
1. A s-tetrazine compound of the formula:

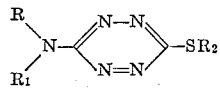

wherein R and $R_1$ are each substituents selected from the group consisting of hydrogen, lower alkyl and lower alkenyl and $R_2$ is a substituent selected from the group consisting of lower alkyl and lower alkenyl.

2. The compound: 3-methylthio-6-amino-s-tetrazine.
3. The compound: 3-methylthio - 6 - dimethylamino-s-tetrazine.
4. The compound: 3-methylthio-6-diethylamino-s-tetrazine.
5. The compound: 3-methylthio-6-(sec.butylamino)-s-tetrazine.
6. The compound: 3 - methylthio - 6 - isobutylamino-s-tetrazine.
7. A method for the preparation of a s-tetrazine of the formula:

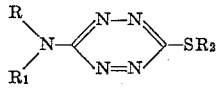

wherein R and $R_1$ are each substituents selected from the group consisting of hydrogen, lower alkyl and lower alkenyl and $R_2$ is a substituent selected from the group consisting of lower alkyl and lower alkenyl which comprises: reacting under at least autogenous pressure at a temperature between 50° C. and 100° C. at least equimolar amounts of (a) a bis-alkylthio-s-tetrazine of the structure:

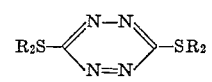

wherein $R_2$ is a substituent selected from the group consisting of lower alkyl and lower alkenyl and (b) a nitrogen reactant selected from the group consisting of ammonia, lower alkylamine and lower alkenylamine.

8. The method of claim 7 wherein the s-tetrazine reactant is: 3,6-bis-methylthio-s-tetrazine and the nitrogen reactant is ammonia.
9. The method of claim 7 wherein the s-tetrazine reactant is: 3,6-bis-methylthio-s-tetrazine and the nitrogen reactant is dimethylamine.
10. The method of claim 7 wherein the s-tetrazine reactant is: 3,6-bis-methylthio-s-tetrazine and the nitrogen reactant is diethylamine.
11. The method of claim 7 wherein the s-tetrazine reactant is: 3,6-bis-methylthio-s-tetrazine and the nitrogen reactant is sec.butylamine.
12. The method of claim 7 wherein the s-tetrazine reactant is: 3,6-bis-methylthio-s-tetrazine and the nitrogen reactant is monoisobutylamine.

References Cited

UNITED STATES PATENTS 3,155,488  11/1964  Lutz et al. _____ 260—241

JOHN D. RANDOLPH, *Primary Examiner.*

WALTER A. MODANCE, N. S. MILESTONE,
*Examiners.*

R. T. BOND, *Assistant Examiner.*